United States Patent [19]

Grantz et al.

[11] Patent Number: 5,076,350
[45] Date of Patent: Dec. 31, 1991

[54] HEAT TUBE DESIGNED PLATE HEAT EXCHANGER

[75] Inventors: Helmut Grantz; Wolfgang Odebrecht, both of Sindelfingen, Fed. Rep. of Germany

[73] Assignee: Mercedes-Benz AG, Fed. Rep. of Germany

[21] Appl. No.: 716,281

[22] Filed: Jun. 17, 1991

[30] Foreign Application Priority Data

Jun. 26, 1990 [DE] Fed. Rep. of Germany ....... 4020265

[51] Int. Cl.⁵ ............................................. F28D 15/02
[52] U.S. Cl. ................... 165/104.21; 392/358; 392/377; 392/378; 122/39
[58] Field of Search ............. 165/104.21; 392/357, 392/358, 359, 377, 378; 122/39

[56] References Cited

U.S. PATENT DOCUMENTS

| 1,235,811 | 8/1917 | Kelly | 122/39 |
|---|---|---|---|
| 2,043,570 | 6/1936 | Baird | 165/104.21 |
| 2,455,688 | 12/1948 | Malickson | 392/378 |
| 2,966,033 | 12/1960 | Hughel | 62/333 |
| 4,550,774 | 11/1985 | Andres et al. | 165/104.21 |
| 4,724,824 | 2/1988 | McCoy et al. | 122/39 |

Primary Examiner—Albert W. Davis, Jr.
Attorney, Agent, or Firm—Evenson, Wands, Edwards, Lenahan & McKeown

[57] ABSTRACT

A plate heat exchanger designed as a heat tube in the form of a multi-layer expanded partly laminated body has an integrated, fluidically continuous large-surface channel structure. Formed in the vicinity of the outer edge is a condensate-collecting channel which is fluidically connected unobstructedly to the channel structure. A heating bar or a heating channel is arranged near the edge separately but connected heat-conductively. To prevent condensate from flowing off on one side within the condensate-collecting channel as a result of gravity and/or horizontal acceleration and thereby to ensure the best possible heating effect, the condensate-collecting channel is subdivided into condensate pockets by a plurality of flow obstacles.

8 Claims, 2 Drawing Sheets

HEAT TUBE DESIGNED PLATE HEAT EXCHANGER

BACKGROUND AND SUMMARY OF THE INVENTION

The invention relates to a plate heat exchanger and, more particularly, to a plate heat exchanger designed as a heat tube design in the form of a multi-layer expanded partly laminated body with an integrated, fluidically continuous large surface channel structure including a slope, which is at least slight in the installation position of the plate heat exchanger. The slope allows for the gravitational return of the condensate within the channel structure towards the edge of the plate heat exchanger. The channel structure merges in the region of this edge into a condensate-collecting channel extending parallel to the edge. A linear heat-supply element is in heat-conductive contact with the condensate-collecting channel. The heat supply element has the form of at least one of a heating bar and a heating channel.

This type of heat exchanger is known, for example, from German Patent Specification 3,144,089 or other further plate-type heat exchanger publications such as German Offenlegungsschrift 2,730,541, German Offenlegungsschrift 3,041,710, German Patent Specification 3,203,369 or Japanese Preliminary Patent Application 56-130,589, laid open on 13.10.1981.

Plate exchangers or this type, because of their light-weight construction, are readily used in vehicles, for example for omnibus heating. The supply of heat from an external heat source occurs in the region of the longitudinal edge of the plate heat exchanger located geodetically at the bottom in the installation position. The supply of heat comes from a heating bar, heating channel or the like, via which the condensate of the heat-transfer medium collecting in the parallel condensate-collecting channel evaporates and the heat is thus distributed in the large-surface channel structure of the plate heat exchanger. It is important for uniform distribution of the heat over the entire plate of the plate heat exchanger from the marginal edge that the entire length of the condensate-collecting channel be covered with condensate. However, when plate heat exchangers are installed in vehicles, this cannot always be presupposed, because the condensate tends to accumulate at one end of the condensate-collecting channel due to several factors. These factors include the slope of the road on which the vehicle is located - ascending or descending gradient, pronounced transverse inclination of the road profile - or the driving status of the vehicle - transverse acceleration during cornering, longitudinal acceleration or deceleration. This impairs the heating power of the plate heat exchanger and is detrimental to a uniform distribution of the heat over the entire surface.

There is therefore needed a plate heat exchanger of the relevant generic type, wherein despite such unavoidable operating conditions, the best possible heating in terms of transmittable power and of uniform distribution of the heating power over the surface of the plate heat exchanger can nevertheless be guaranteed.

According to the invention, this need is met by means of a plate heat exchanger wherein the condensate-collecting channel is subdivided by run-off obstacles projecting from the underside into a clearance profile of the condensate-collecting channel. The underside is near the edge of the heat exchanger and lower in the direction of gravity. The run-off obstacles take the form of at least one of bottom elevations, bottom corrugations and retaining weirs. The run-off obstacles project into condensate pockets which, despite any longitudinal slope of the condensate-collecting channel, prevent the condensate from flowing off in the longitudinal direction. Because the condensate-collecting channel is subdivided into a plurality of condensate pockets partitioned off from one another by flow obstacles, the condensate running back out of the plate heat exchanger over the surface uniformly, at least in rough approximation, is also retained uniformly in the condensate-collecting channel over the length of the latter. Under the influence of mass or gravity in the longitudinal direction of the condensate-collecting channel, the condensate can at most run within the longitudinal extent of one condensate pocket.

Other objects, advantages and novel features of the present invention will become apparent from the following detailed description of the invention when considered in conjunction with the accompanying drawings.

DETAILED DESCRIPTION OF THE DRAWINGS

Figure 1:
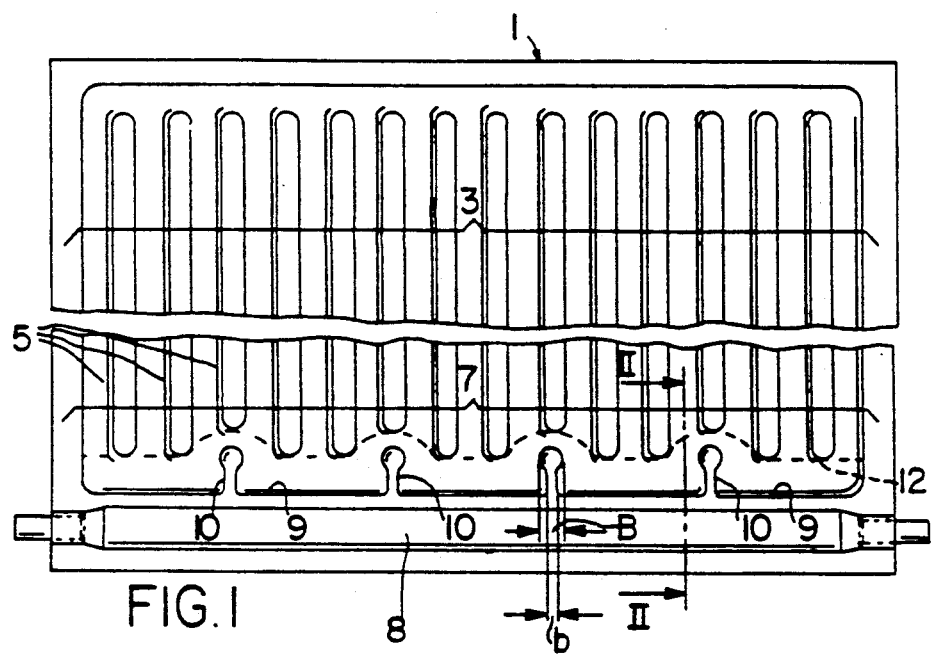
FIG. 1 is a view of the flat side of a plate heat exchanger for vertical installation.
Figure 2:
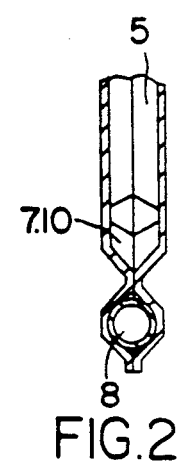
FIG. 2 is a partial cross-section through the plate heat exchanger according to FIG. 1 along the sectional line II—II.

The plate heat exchangers illustrated in the Figures are designed in the form of a two-layer expanded partly laminated body, in which a fluidically continuous large-surface channel structure is integrated in the plate heat exchanger.

In the exemplary embodiment of the plate heat exchanger 1 for vertical installation illustrated in FIGS. 1 to 4, the large-surface channel structure 3 is formed by a plurality of vertically extending individual channels 5, by a horizontal channel extending n the region of the top edge of the plate heat exchanger 1 and by a condensate-collecting channel 7 extending horizontally near the bottom edge. A further channel serving as a heating channel 8 extends within the plate heat exchanger 1 in parallel with the condensate-collecting channel 7 and being completely fluidically separated. Hot water can be conveyed through the heating channel 8 via connections leading outwards. In any event, the heating channel 8 is heat-conductively connected with the condensate-collecting channel 7 via a wall portion of the plate heat exchanger. The wall portion is narrow, that is to say it is short in the heat-flow direction, and is unexpanded, so that the heat which can be supplied via the heating channel 8 can be transmitted to the condensate-collecting channel 7 or the condensate collecting in this.

The continuous cavity of the large-surface channel structure 3 is evacuated and a small part of it filled with an evaporable medium, for example with water or ammonia. The evacuating and filling connection necessary for this is not shown in FIG. 1. After the evacuation and the introduction of the heat-transfer medium, it must be closed hermetically, for example, fused shut. When the plate heat exchanger thus designed as a heat tube is in operation, the heat-transfer medium present in the liquid phase in the condensate-collecting channel 7 evaporates as a result of the supply of heat from the heating channel 8. The generated vapor spreads uniformly in the large-surface channel structure 3 and condenses again on the inner wall in the region of the entire surface of the plate heat exchanger. The evaporation heat is given off again in the entire region of the surface extent of the plate heat exchanger or its channel structure 3. As a result of gravity, the condensate formed runs back into the condensate-collecting channel 7 again and the circuit is thus closed.

Figure 3:
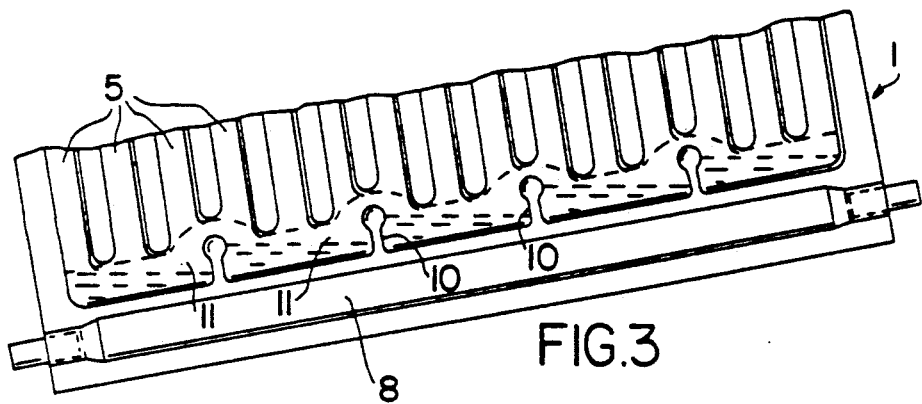
FIG. 3 illustrates the lower part of the plate heat exchanger according to FIG. 1 in an inclined position.
Figure 4:
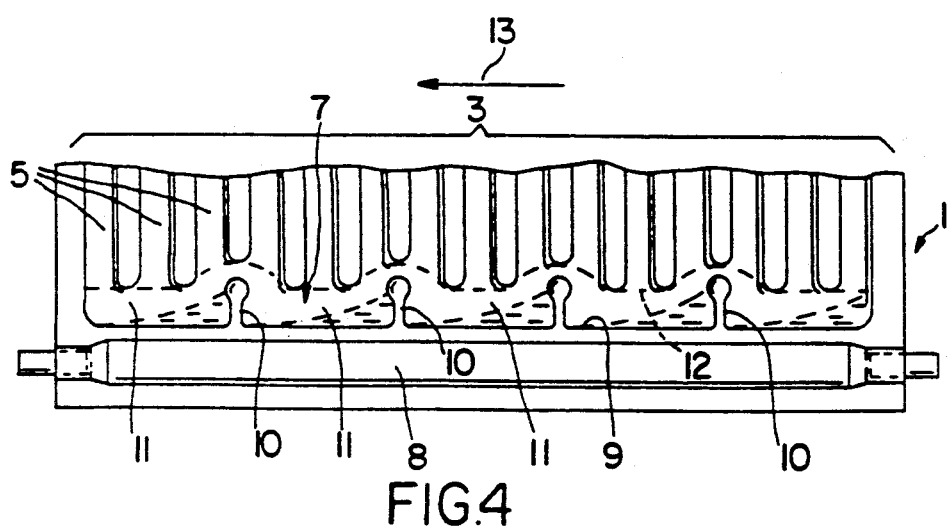
FIG. 4 illustrates the lower part of the plate heat exchanger under the influence of an acceleration effect.
Figure 5:
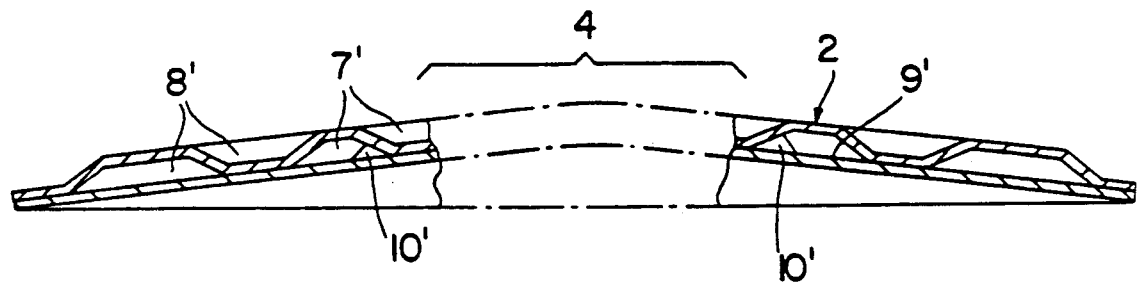
FIG. 5 illustrates an enlarged cross-section view through and a plan view of a further exemplary embodiment of a plate heat exchanger for horizontal installation.

In order to ensure, even with the plate heat exchanger 1 in an inclined position (FIG. 3) or under horizontal acceleration (vector 13 in FIG. 4) that the condensate present in the condensate-collecting channel 7 does not run away on one side and the condensate-collecting channel partially run dry, the condensate-collecting channel 7 is subdivided into a plurality of condensate pockets 11 according to the present invention. The condensate pockets 11 prevent the condensate from flowing off one side in the longitudinal direction of the condensate-collecting channel 7. For this purpose, a plurality of run-off obstacles 10 are arranged in succession in the condensate-collecting channel 7 and project from the underside 9 of the condensate-collecting channel which is near the edge and lower in the direction of gravity into the clearance profile of the latter. They act in the manner of retaining weirs. Appropriately, the run-off obstacles 10 can be provided in the region of channel junctions of the large-surface channel structure 3, where a plurality of individual channels 5 open into the condensate-collecting channel 7 close to one another. In order to ensure that at least the vapor spreading within the large-surface channel structure 3 has the possibility of an unimpeded transverse flow within the condensate-collecting channel too, even in the region of such a run-off obstacle 10, the top side 12 of the condensate-collecting channel 7, located higher in the direction of gravity and suggested by broken lines in FIGS. 1, 3 and 4, is bulged upwards in the region of the run-off obstacles 10. The condensate is thus retain din the longitudinal direction by the run-off obstacles 10, whereas the vapor can spread unimpeded in the longitudinal direction as a result of the bulging path.

As a result of horizontal accelerations, especially braking operations, very high inertia forces can act for a short time on the condensate which has collected in the condensate-collecting channel 7 or in the condensate pockets 11. FIG. 4 shows such a deceleration vector 13. In order to safely retain the condensate present in the individual condensate pockets 11 even in such an instance of brief, but very high inertia forces, the run-off obstacles 10 are made wider—width B—in the longitudinal direction of the channel in the region of their upper end than in the root region near the edge where they have only a small width b. This widening of the run-off obstacles 10 in the head region gives rise to surge pockets which prevent the condensate from spilling over from one condensate pocket into the other. Admittedly, it would also be possible to prevent such an overspill by making the run-off obstacles especially high. This would be inappropriate, however, because the storage volume of the condensate pockets would then be very large and an uneven distribution of condensate within the various condensate pockets, once it had occurred in response to operating conditions, would be maintained. The aim is to keep the storage volume of individual condensate pockets small, so that, in the event of a locally concentrated occurrence of condensate, the condensate pocket assigned to this region is filled relatively quickly and overflows to the adjacent condensate pockets. Therefore, despite a locally concentrated occurrence of condensate and despite the run-off obstacles within the condensate-collecting channel, the condensate can nevertheless be distributed in the longitudinal direction of the condensate-collecting channel. The condensate can, for example, occur in a locally concentrated manner at one point of the condensate-collecting channel when the plate heat exchanger is cooled intensively at a specific point, for example when a wet, narrow article of clothing is laid on the plate heat exchanger or hung over it. Some unevenness in the heat emission of the plate heat exchanger can also occur if the convection and/or heat radiation is externally disturbed or irregular.

The invention explained herein by the example of a plate heat exchanger 1 for vertical installation can also be put into practice analogously on a similar plate heat exchanger 2 for horizontal installation. This plate heat exchanger 2 is curved slightly in an umbrella-like manner, so that the large-surface channel structure 4 formed from individual channels 6 arranged crosswise has a slope pointing towards the edge in all directions. The condensate-collecting channel 7' extends annularly around the entire large-surface channel structure 4 and constitutes, with the individual channels 6 of the latter, a continuous channel system.

Figure 6:
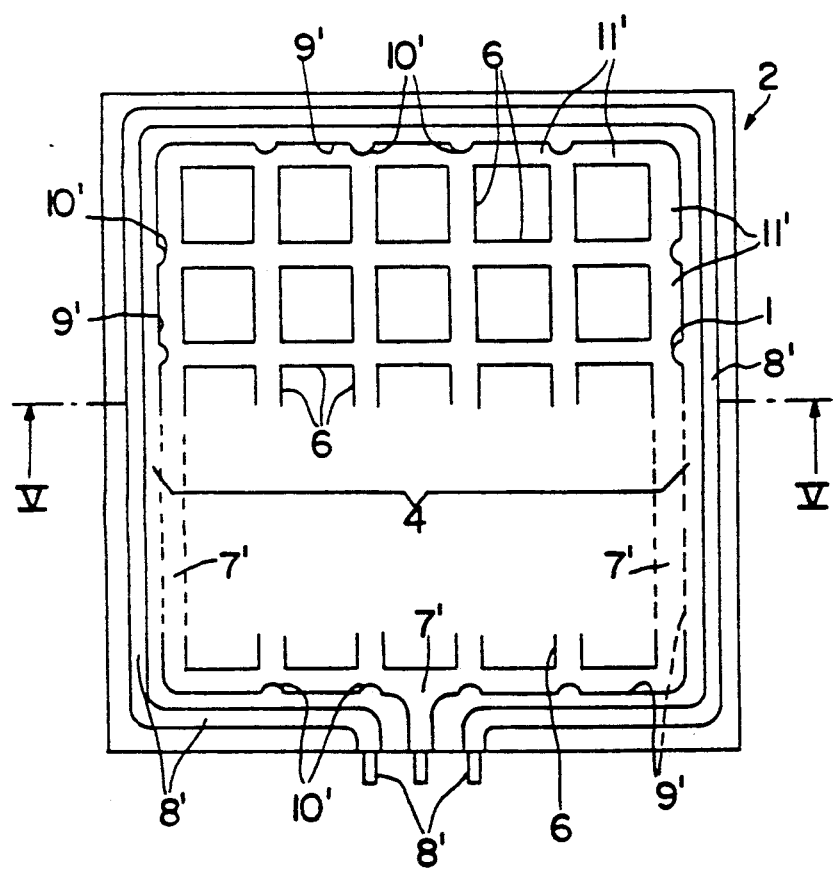
FIG. 6 is a plan view of a further exemplary embodiment of a plate heat exchanger for horizontal installation.

In this exemplary embodiment, FIG. 6 shows at the bottom the fused-shut evacuating and filling connection for the heat-transfer medium. The associated heating channel 8' extends, in a similar way to the condensate-collecting channel 7', along the entire outer edge of the plate heat exchanger 2. Here too, the heating channel 8' can receive hot water via connections leading outwards. The run-off obstacles 10' in the condensate-collecting channel and/or from the lower outer edge of the condensate-collecting channel into the interior of the latter and subdivide the condensate-collecting channel 7' into a plurality of condensate pockets arranged in succession. It thereby becomes impossible or at least more difficult for the condensate to run away in the longitudinal direction of the condensate-collecting channel in the event of a transverse inclination or under the influence of horizontal force.

Even if the transverse inclination of the plate heat exchanger and/or the influence of horizontal forces have only a temporary effect and, after the plate heat exchanger or condensate-collecting channel 7 or 7' has returned to the horizontal position and/or the influence of horizontal force has ceased, the condensate located in the condensate-collecting channel could once again be distributed uniformly within the condensate-collecting channel. Nevertheless, the run-off obstacles according to the present invention are expedient, because such a back flow or automatic equalization of condensate takes place only very slowly because of the small condensate quantities, and because ceaselessly renewed disturbances of such an automatic condensate equalization occur in the meantime. The danger that particular points of the condensate-collecting channel can constantly run dry and therefore not be utilized for heat transmission is much too great.

The run-off obstacles according to the present invention in the condensate-collecting channels guarantee a uniform distribution of the condensate within the condensate-collecting channel and a uniform distribution of the heat to the plate heat exchanger despite persistent disturbances. Even when there is a locally uneven occurrence of condensate, a uniform distribution of the condensate within the condensate-collecting channel is not unduly impeded.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A plate heat exchanger having a heat tube design in the form of a multi-layer expanded partly laminated body with an integrated, fluidically continuous large-surface channel structure includes, a slope, which is at least slight in the installation position of the plate heat exchanger, for the gravitational return of the condensate within the channel structure towards the edge of the plate heat exchanger, said channel structure merging in the region of this edge into a condensate-collecting channel extending parallel to the edge, a linear heat-supply element in heat-conductive contact with the condensate-collecting channel, said heat supply element having the form of at least one of a heating bar and a heating channel;

wherein the condensate-collecting channel is subdivided by run-off obstacles, projecting from the underside, said underside being near the edge of the heat exchanger and lower in the direction of gravity, into a clearance profile of the condensate-collecting channel, wherein said run-off obstacles take the form of at least one of bottom elevations, bottom corrugations and retaining weirs, said run-off obstacles projecting into condensate pockets which, despite any longitudinal slope of the condensate-collecting channel, prevent the condensate from flowing off in the longitudinal direction.

2. A plate heat exchanger according to claim 1, wherein said run-off obstacles are arranged in the region of opening points of individual channels out of the large-surface channel structure into the condensate-collecting channel.

3. A plate heat exchanger according to claim 2, wherein, in the region of a run-off obstacle, the condensate-collecting channel has, on its top side further from the edge and higher in the direction of gravity, a shape which bulges in the direction of the large-surface channel structure.

4. A plate heat exchanger according to claim 3, wherein the run-off obstacles are made wider in the longitudinal direction of the channel in the region of their top side pointing into the inside of the condensate-collecting channel than in a root region near the edge, so as to form surge pockets.

5. A plate heat exchanger according to claim 2, wherein the run-off obstacles are made wider in the longitudinal direction of the channel in the region of their top side pointing into the inside of the condensate-collecting channel than in a root region near the edge, so as to form surge pockets.

6. A plate heat exchanger according to claim 1, wherein, in the region of a run-off obstacle, the condensate-collecting channel has, on its top side further from the edge and higher in the direction of gravity, a shape which bulges in the direction of the large-surface channel structure.

7. A plate heat exchanger according to claim 6, wherein the run-off obstacles are made wider in the longitudinal direction of the channel in the region of their top side pointing into the inside of the condensate-collecting channel than in a root region near the edge, so as to form surge pockets.

8. A plate heat exchanger according to claim 1, wherein the run-off obstacles are made wider in the longitudinal direction of the channel in the region of their top side pointing into the inside of the condensate-collecting channel than in a root region near the edge, so as to form surge pockets.

* * * * *